United States Patent
Shimizu et al.

(10) Patent No.: US 6,580,080 B1
(45) Date of Patent: Jun. 17, 2003

(54) NEUTRON BEAM CONTROLLING APPARATUS, AND NEUTRON ENERGY MEASURING APPARATUS

(75) Inventors: Hirohiko Shimizu, Wako (JP); Takayuki Oku, Wako (JP); Yuji Kawabata, Sennan-gun (JP)

(73) Assignee: Riken (JP)

( * ) Notice: Subject to any disclaimer, the term of this patent is extended or adjusted under 35 U.S.C. 154(b) by 0 days.

(21) Appl. No.: 09/520,154

(22) Filed: Mar. 7, 2000

(30) Foreign Application Priority Data

Mar. 8, 1999 (JP) .......................................... 11-060630

(51) Int. Cl.[7] ................................................ G21K 1/06
(52) U.S. Cl. .................. 250/390.1; 250/251; 250/505.1
(58) Field of Search ............................. 250/505.1, 251, 250/390.1

(56) References Cited

U.S. PATENT DOCUMENTS

| | | | |
|---|---|---|---|
| 5,016,267 A | 5/1991 | Wilkins | 378/84 |
| 5,757,882 A | 5/1998 | Gutman | 378/84 |
| 5,799,056 A | 8/1998 | Gutman | 378/84 |
| 5,880,478 A | * 3/1999 | Bishop et al. | 250/505.1 |
| 6,054,708 A | 4/2000 | Shimizu | 250/251 |

FOREIGN PATENT DOCUMENTS

| | | |
|---|---|---|
| JP | 6-235797 | 8/1994 |
| JP | 10-247599 | 9/1998 |

OTHER PUBLICATIONS

Compound Refractive Optics for the Imaging and Focusing of Low–Energy Neutrons, Eskildsen et al., Nature, vol. 391, Feb. 5, 1998, pp. 563–566.
Parallel–Beam Coupling into Channel–Cut Monochromators Using Curved Graded Multilayers, M. Schuster et al., Journal of Physics D: Applied Physics 28(1995) Apr. 14, No. 4A, pp. A270–A275.

* cited by examiner

Primary Examiner—Constantine Hannaher
(74) Attorney, Agent, or Firm—Pennie & Edmonds LLP

(57) ABSTRACT

A neutron beam controlling apparatus includes a plurality of multilayered plate members, each having on one or both of its surfaces, one or more minute protruding portions. Each of the protruding portions is a long and narrow protrusion extending in an area-wise direction and having both an inclined surface that is inclined against the beam axis of neutron beam and serves as an incident plane or an outgoing plane for the neutron beam and a surface approximately normal to the plate member.

15 Claims, 15 Drawing Sheets

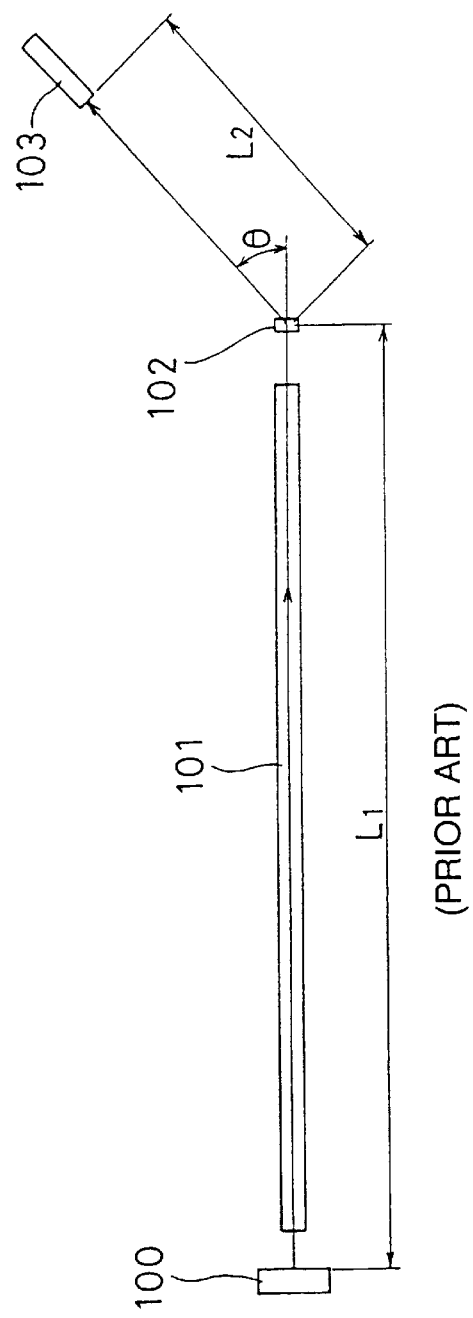
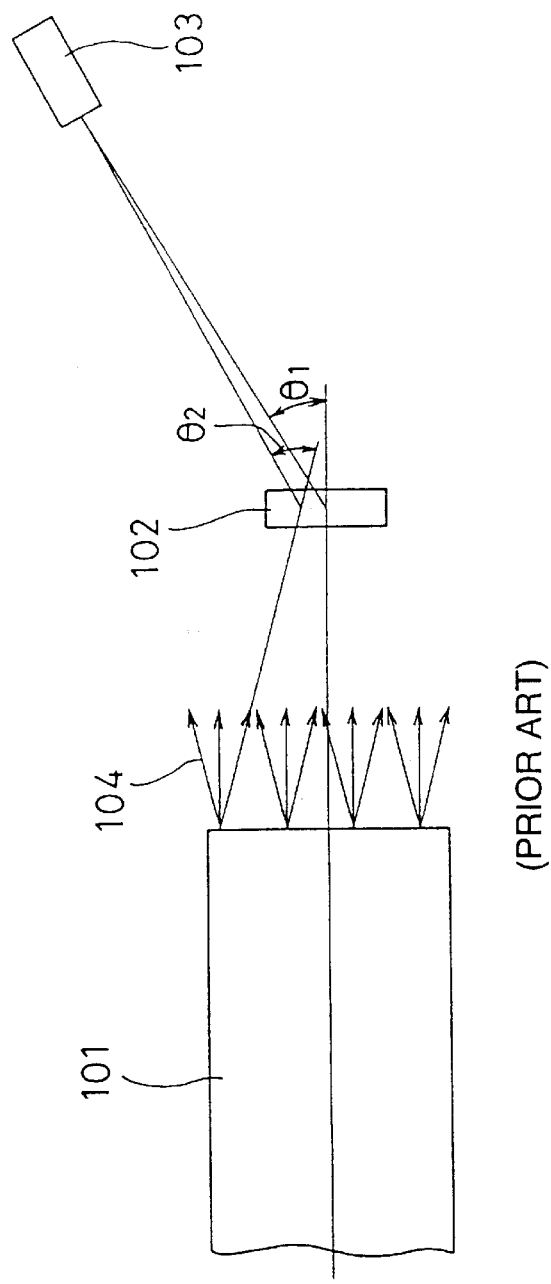
FIG. 16A (PRIOR ART)
FIG. 16B (PRIOR ART)

NEUTRON BEAM CONTROLLING APPARATUS, AND NEUTRON ENERGY MEASURING APPARATUS

FIELD OF THE INVENTION

The present invention relates to an apparatus for controlling the beam shape of neutron beam, the velocity direction thereof or the like, and to an apparatus for measuring the energy of neutrons.

DESCRIPTION OF RELATED ART

Neutron is an important probe in material science due to its features such as the follows: (a) it interacts with nuclei in a material strongly; (b) it has kinetic energy and wavelength at the same order as the atomic motion in a material and the scale of atomic structure, respectively; and (c) it has a strong penetrability.

Neutrons provide the information of nuclei in a material through the nuclear interaction, while X-rays and photons provide the information of atoms in a material through the electromagnetic interactions. Therefore, neutron scattering experiments are necessary in the determination of the position and the motion of nuclei regardless of electron clouds of atoms.

The strength of neutron-nuclear interaction has irregularity with respect to the atomic number of elements and varies depending on the mass number of isotopes, which is largely different from the strength of electromagnetic interaction which has a monotonous dependence only on the atomic number. This feature is applied to distinguish elements having similar electromagnetic scattering strengths and isotopes of an atomic number. It is also applicable to determine the position and the motion of light elements, for example, for the study of hydrogen atoms in an organic material.

The neutron magnetic dipole moment originated from its ½ spin is suitable to study the magnetic structure of a material. The strong penetrability can be applied to investigate the macroscopic structure of bulk samples such as industrial products, which are difficult to be investigated using charged particles and X-rays.

Efficient use of neutron beam is very important since neutron beam is available only in limited facilities equipped with nuclear reactors, accelerators and strong radioactive sources. Improvement of neutron beam transport from a neutron source to a neutron spectrometer is strongly desired since the improvement of neutron source intensity is limited by both the cost and the radiation control technique utilized. The improvement not only reduces the measuring time but also enables us to carry out in situ measurements of transient phenomena and to study the structure of new materials which are not available in the form of large-scale single crystals. It also reduces the risks in radiation safeties.

A neutron guide has been commonly used for transport of neutrons. A neutron beam can be bent by the reflection on the interface of medium (e.g., the interface between air and other medium) with a sufficiently small incident angle. A neutron guide is a vacuum tube of which inner surface is coated with a neutron reflector such as nickel. The neutron guide is pumped to vacuum to minimize the neutron loss caused by, for example, scattering by air. Neutrons incident to the guide at an angle smaller than the critical angle of the neutron reflector material are reflected on the inner surface and transported downstream.

FIG. 16A illustrates the concept of a prior art apparatus for the structural analysis of a material by neutron scattering, and FIG. 16B is the enlarged view of the apparatus around the sample. Neutrons are emitted in all directions from a neutron source 100 (e.g., a nuclear reactor, a radioactive source or a nuclear target bombarded by charged particles). A part of the generated neutrons are transported through a neutron guide 101 and incident to a sample 102. A neutron detector 103 such as a proportional counter 103 measures the intensity of neutrons scattered to the direction of angle θ. Angular distribution of scattered neutrons is analyzed to extract the information related to the atomic structure of the sample. The typical aperture of the neutron guide 101 is about 5 cm and the typical size of the sample 102 is 1–2 cm or larger.

For the purpose of increasing the beam density, a neutron capillary tube can be used. The neutron capillary tube may be in the form of bundled glass tubes 110 which have thin channels of about 10 μm in diameters as shown in FIG. 17. Incident neutrons are transported by the reflection on the inner surface of the channels. Each of the tubes 110 may be bent at a certain angle to focus the neutrons in the tube 110 to a small area 113, whereby the neutron beam density is increased.

Beam divergence of the incident beam should be sufficiently small to provide a good resolution in determination of scattering angles, since the scattering angle cannot be determined precisely if the incident beam is divergent. A common technique for reducing the beam divergence is the neutron diffraction. However, this technique has such a disadvantage that the intensity of the beam transferred to the sample is too much attenuated upon the diffraction.

In the analysis of a new material using neutron beam as a prove, only a very small sample is available. Such a very small sample needs to be irradiated with a dense and thin neutron beam for yielding good analysis result. Moreover, the incident neutron beam is also required to have a small beam divergence for the determination of the atomic structure of the sample with great precision.

The prior art neutron guide, which utilizes the total reflection of neutron beam on the interface between media, can transport neutrons efficiently but cannot focus nor reduce the divergence of the beam. As shown by the arrows in FIG. 16B, neutron beam 104 emitted from a neutron guide 101 diverges. The divergent neutron beam 104 enters a sample 102, from which neutrons each having various scattering angles of $\theta_1$, $\theta_2$, . . . are emitted to a detector 103 and detected by the detector 103. This causes a non-negligible error in determination of neutron scattering angles. In order to reduce the error, a beam collimator can be placed upstream the sample, which disadvantageously suppresses the efficiency of utilization of the neutrons.

As mentioned above, the use of neutron capillary tubes can increase the neutron beam density. However, as shown in FIG. 17, only the neutrons transported through the thin channels of the capillary tubes 110 are focused downstream and the neutrons 112 passing between tubes 110 are not used, which suppresses the efficiency of utilization of the neutrons. In addition, since tubes 110 are curved to bring neutrons into convergence, the beam divergence is enlarged at the focal point, which is not suitable for a good angular resolution.

To provide neutron beam with reduced divergence, neutron diffraction by a single crystal can be utilized. However, in this case, the beam intensity is too much attenuated.

As mentioned above, conventional methods related to neutron beam control are not appropriate to obtain a thin and dense neutron beam. In addition, up to now, no apparatus is known which can measure the energy of neutrons directly and conveniently.

SUMMARY OF THE INVENTION

Under these circumstances, the present invention has been accomplished. That is, an object of the present invention is to provide an apparatus for controlling the beam shape of neutron beam, the velocity direction thereof or the like. Another object of the present invention is to provide an apparatus for measuring the energy of neutrons directly and readily.

The above and other objects, effects, features and advantages of the present invention will become more apparent from the following description of embodiments thereof.

BRIEF DESCRIPTION OF THE DRAWINGS

FIGS. 16A and 16B are views illustrating the concept of a apparatus for analyzing the structure of a material by neutron scattering according to the prior art, wherein FIG. 16A is a general view and FIG. 16B is an enlarged view of a portion around a sample.

DETAILED DESCRIPTION OF THE INVENTION

The interaction between neutrons and a material is considered to be almost the interaction between neutrons and nuclei in the material. The interaction between low-energy neutrons and nuclei is described by a potential. A value determined by averaging the total potential of the nuclei by the volume of the material is called "effective potential". An effective potential value is usually extremely small since the volume of the nuclei occupying in the material is very small. Among elements with natural abundance, Be exerts the highest effective potential, which is as small as about 250 neV.

Figure 1:
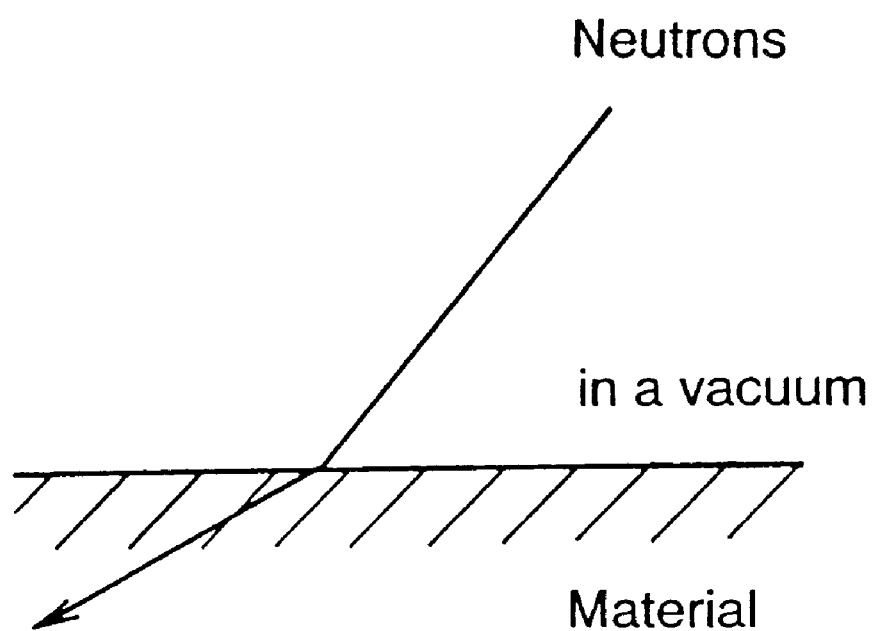
FIG. 1 a view illustrating the principle of the refraction of neutron beam in a material.

Effective potentials are usually positive. Elements with natural abundance have positive effective potentials, except Mn, Ti, Li, V and H which have negative effective potentials. When a material has positive effective potential, a part of the kinetic energy of incident neutron beam is lost since the part is converted to effective potential upon entering the material, whereby the neutron beam is moderated in the direction perpendicular to the surface of the material. Accordingly, neutrons obliquely incident to a material of positive effective potential is refracted at the surface of the material as shown in FIG. 1. In this case, it can be said that the neutrons have an index of refraction smaller than 1. In contrast, when a material has negative effective potential, the reverse is the case and the index of refraction is lager than 1.

In the production of a neutron refracting apparatus (i.e., a neutron beam controlling apparatus) such as a neutron prism and a neutron lens, the material used for the apparatus is required to have an index of refraction much greater or smaller than 1 so as to bend neutron beam to a larger extent and have a large permeation to the neutrons. Candidate elements which satisfy these requirements include, among elements with natural abundance, O, C, Be and F; and among enriched isotopes, D (deuterium). Polytetrafluoroethylene (PTFE), which is a compound composed of such elements, exerts effective potential of $(112±3.9×10^{-5})$ neV. Neutron beam of 14Å wavelength which is incident to the PTFE surface at an incident angle of 45° is bent by 0.14 mrad at the surface of the PTFE.

One-time oblique incidence of neutron beam to a material causes only a small angle of refraction of the neutron beam. However, multiple times of such oblique incidence of neutron beam through multiple numbers of material surfaces causes a continuous refraction of the neutron beam, which is applicable for the manufacture of a practical neutron beam refracting device (i.e., a neutron beam controlling apparatus).

The present invention has been achieved based on the studies on the interaction between neutron beam and materials as mentioned above. According to the present invention, it becomes possible to construct a neutron beam refracting apparatus for controlling the beam shape of neutron beam, the velocity direction thereof or the like.

The present invention provides a neutron beam controlling apparatus comprising a plurality of multilayered plate members, each of the plate members having on its one or both surfaces one or a plurality of minute protruding portions, and each of the protruding portions having an inclined surface which is inclined against the beam axis of neutron beam and serves as an incident plane or an outgoing plane for the neutron beam. In the apparatus, each of the minute protruding portions may be a long and narrow protrusion (which has a triangular cross section taken perpendicular to the length-wise direction) which extends in an area-wise direction and has both the inclined surface and a surface approximately normal to the plate member. In this case, each of the minute protruding portions may be a long, narrow and linear protrusion having both the inclined surface and a surface approximately normal to the plate member, and all of the inclined surfaces incline toward the same direction, whereby neutron beam entering the apparatus can be refracted in one direction.

The present invention also provides a neutron beam controlling apparatus comprising a plurality of multilayered plate member s, each of the plate members having on its one or both surfaces one or a plurality of circularly protruding portions arranged so as to form a concentric structure around the central axis of the apparatus, each of the circularly protruding portions having both a surface approximately normal to the plate member and a surface inclined toward the center of the concentric structure, and, when observed in the direction parallel to the central axis, the superposition degree of the circularly protruding portions larger as the distance from the central axis becomes longer. The apparatus can focus neutron beam, which is a function corresponding to the function of a convex lens in an optic system.

The present invention also provides a neutron beam controlling apparatus comprising a plurality of multilayered plate members, each of the plate members having on its one or both surfaces one or a plurality of circularly protruding portions arranged so as to form a concentric structure around the central axis of the apparatus, each of the circularly protruding portions having both a surface approximately normal to the plate member and a surface inclined outward the concentric structure, and, when observed in the direction parallel to the central axis, the superposition degree of the circularly protruding portions becomes larger as the distance from the central axis becomes longer. The apparatus can make neutron beam diverge, which is a function corresponding to the function of a concave lens in an optic system.

In the apparatus having the convex or concave lens function, at least one of the plate members may have an opening portion at the center.

The apparatus having the convex lens function and the apparatus having the concave lens function may be combined to provide a neutron beam controlling apparatus which, for example, can convert parallel neutron beam having a large beam diameter to that having a small beam diameter.

In the above-described apparatuses, each of the plate members may comprise a material comprising mainly at least one element selected from the group consisting of oxygen (O), carbon (C), beryllium (Be), fluorine (F) and deuterium ($D_2$) Specific examples of the material include polytetrafluoroethylene, carbon, deuterated polyethylene, heavy water and dry ice. Deuterated polyethylene [($-CD_2-CD_2-$)$_n$] is a compound prepared by substituting the hydrogens in normal polyethylene by deuteriums. When a plate member is prepared from heavy water, heavy water may be packed in a package made of a TEFLON® (tetrafluoroethylene fluorocarbon polymer) or deuterated polyethylene-made thin film or may be iced.

The present invention also provides a neutron measuring apparatus comprising means for emitting neutrons therefrom in the form of a neutron beam; a neutron beam controlling apparatus as described above to which the neutron beam is incident; and a position-sensitive neutron detector for detecting the neutrons emitted from the neutron beam controlling apparatus.

DESCRIPTION OF THE PREFERRED EMBODIMENTS

The present invention will be described in more detail with reference to the drawings.

Embodiment 1

Figure 2A:
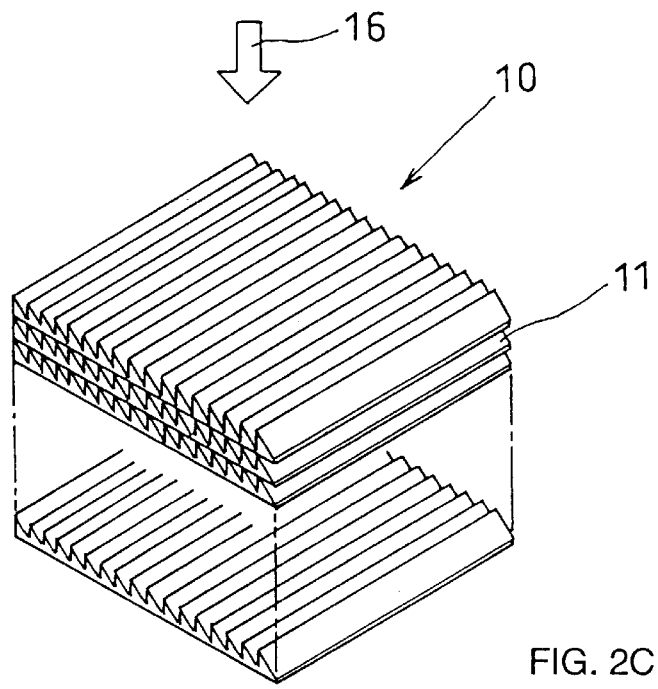
FIGS. 2A, 2B and 2C are views illustrating the construction of an embodiment of the neutron beam controlling apparatus according to the present invention.
Figure 2C:
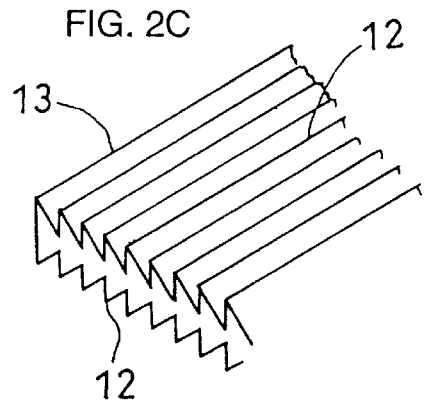
Figure 2B:
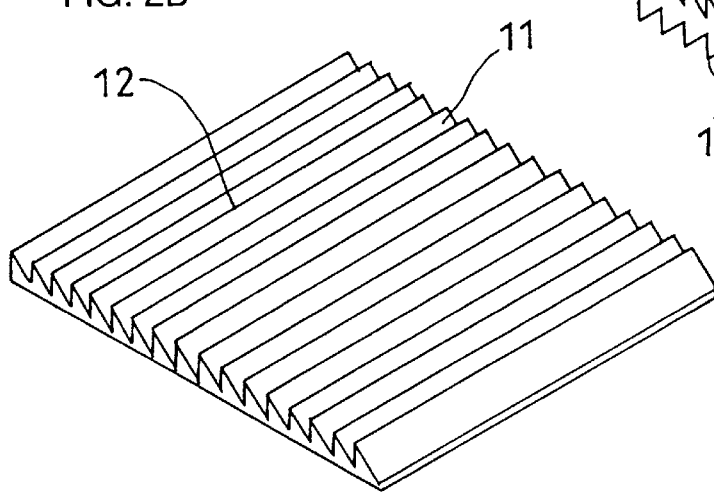
Figure 3A:
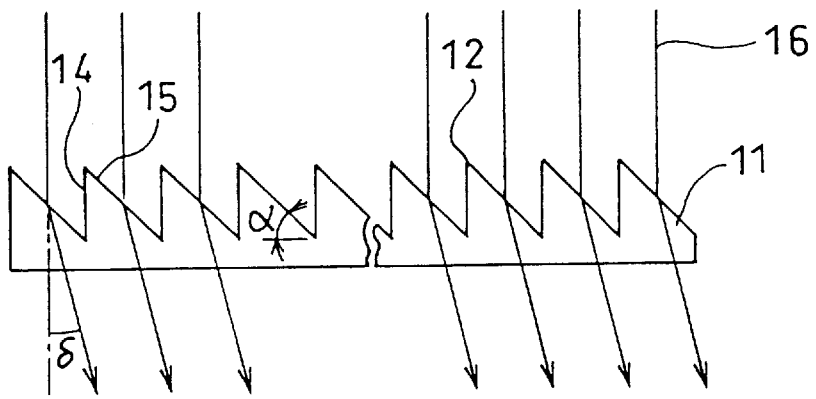
FIGS. 3A and 3B are views illustrating the function of the neutron beam controlling apparatus shown in FIGS. 2A, 2B and 2C.
Figure 3B:
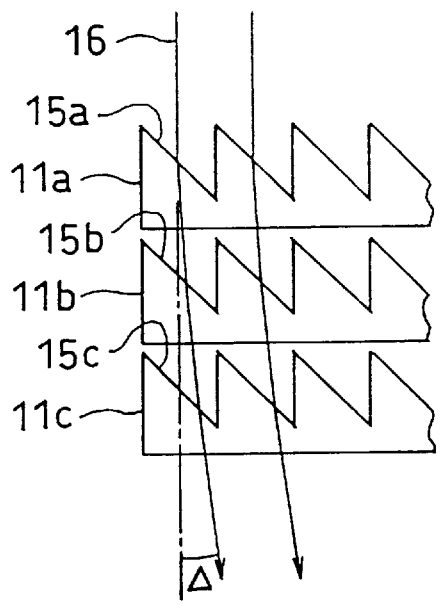

FIGS. 2A–2C and 3A–3B illustrate an embodiment of the neutron beam controlling apparatus according to the present invention. FIGS. 2A–2C are views illustrating the construction of the apparatus, and FIGS. 3A and 3B are views illustrating the function thereof.

In FIG. 2A, the neutron beam controlling apparatus is conceptually illustrated. As shown in FIG. 2A, the neutron beam controlling apparatus 10 comprises a plurality of multilayered plate members 11 shown in FIG. 2B. Each of the plate members may be produced by processing a thin plate of a material having a high neutron beam penetrability [e.g., polytetrafluoroethylene (PTFE), glassy carbon, and deuterated polyethylene prepared by substituting hydrogens in normal polyethylene by deuteriums] to provide a plurality of long, linear protruding portions 12 each having a triangular cross section and extending to the same direction are closely arranged in parallel. The plate member 11 may also be made of carbon dioxide or heavy water. Carbon dioxide may be used in the form of dry ice, and heavy water may be used by packaging into a container made of a TEFLON® (tetrafluoroethylene fluorocarbon polymer) or deuterated polyethylene film or may be used in iced form.

The plate member 11 may be layered with the side having the protruding portions 12 down. Alternatively, a plate member 13 may also be used which has the protruding portions 12 on the both sides.

FIGS. 3A and 3B illustrate the function of the neutron beam controlling apparatus 10. FIG. 3A is a schematic sectional view illustrating the behavior of neutron beam 16 incident onto a plate member 11. The upper surface of the plate member 11 is provided with linear protruding portions 12 each formed by a surface 14 approximately normal to the bottom surface of the plate member 11 and an inclined surface 15. Neutron beam 16 incident onto the inclined surface 15 of the protruding portion 12 is refracted according to the principle illustrated in FIG. 1. Since the plate member 11 is composed of a material with positive effective potential, the neutron beam 16 is refracted in the plate member 11 at an index of refraction smaller than 1.

Only one-time refraction of the neutron beam 16 provides a very small angle of refraction 8. For example, when the plate member 11 is composed of PTFE and the angle α formed by the inclined surface 15 with the bottom surface of the plate member 11 is 45°, the angle of refraction δ of neutron beam 16 of 14Å wavelength which is incident onto the plate member 11 at an the angle perpendicular to the bottom surface thereof, is as small as 0.14 mrad. In the neutron beam controlling apparatus 10 of the present invention, the number of the interface of matters present in the flight path of the neutron beam 16 is increased in a compact construction to enlarge the overall angle of refraction of the neutron beam 16. That is, the neutron beam 16 incident to the apparatus 10 passes through a plurality of inclined surfaces 15$a$, 15$b$, 15$c$, . . . of multilayered plate members 11$a$, 11$b$, 11$c$, . . . , respectively, as illustrated in FIG. 3B, thereby giving a large angle of refraction Δ. For example, if the angle of refraction δ of neutron beam 16 yielded by passing through one plate member 11 is 0.14 mrad, the neutron beam 16 passing through 129 plate members 11 yields the overall angle of refraction Δ of 17 mrad (=1°).

Embodiment 2

Figure 4:
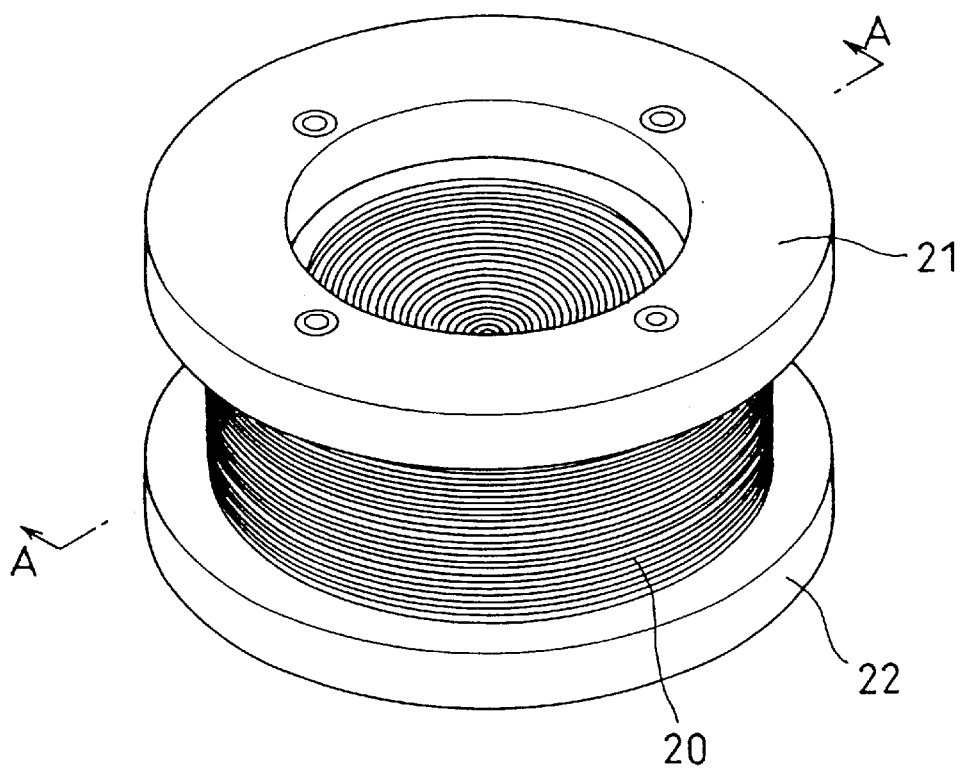
FIG. 4 is a general view of another embodiment of the neutron beam controlling apparatus according to the present invention.
Figure 5:
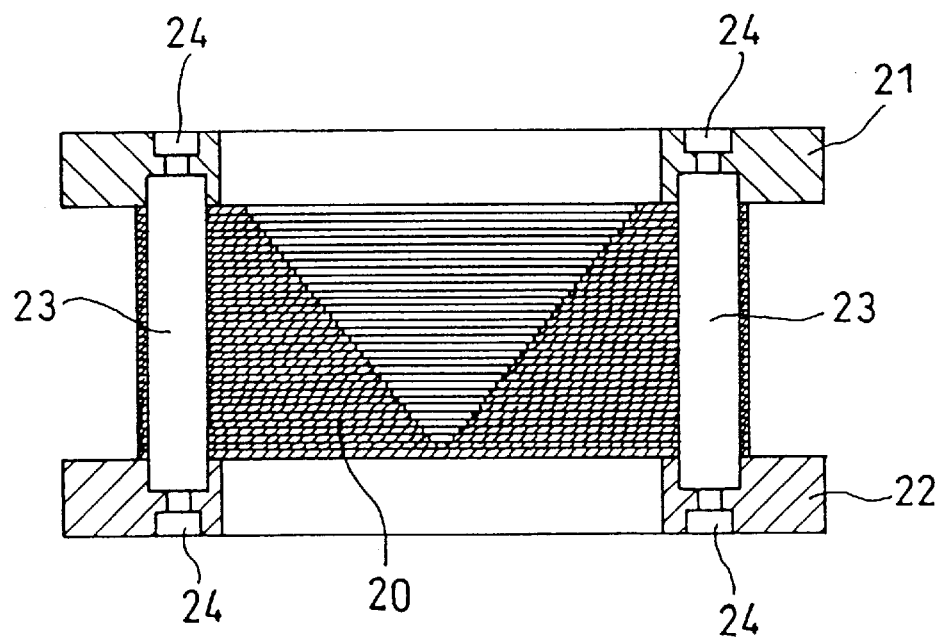
FIG. 5 is a sectional view taken along the lines A—A of FIG. 4.
Figure 6:
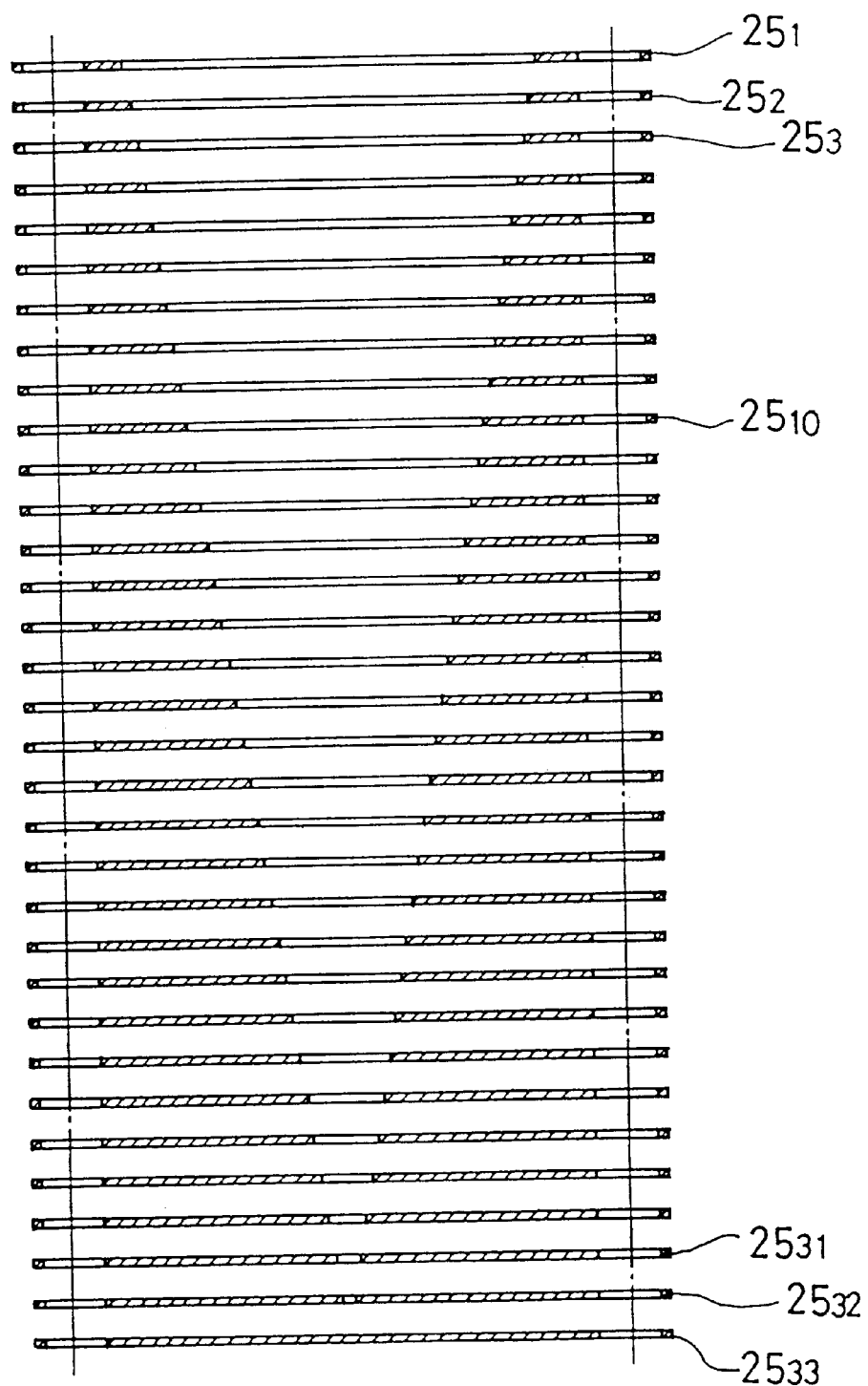
FIG. 6 is a partial exploded sectional view of the apparatus of FIG. 4.

Another embodiment of the neutron beam controlling apparatus which functions to focus neutron beam will be illustrated hereinbelow. FIG. 4 is a general view of the neutron beam controlling apparatus; FIG. 5 is a sectional view taken along the lines A—A of FIG. 4; FIG. 6 is a partial exploded sectional view of the apparatus of FIG. 4; and FIGS. 7A and 7B and FIGS. 8A and 8B are views illustrating two types of plate members used in the apparatus of FIG. 4, respectively.

The neutron beam controlling apparatus of this embodiment is composed of an apparatus body 20 and a pair of circular support frames 21 and 22 for supporting the body 20 therebetween. The apparatus is assembled by sandwiching the body 20 between the circular support frames 21 and 22 and holding them together through pins 23 by screws 24. However, the apparatus may also be assembled in any other fashion.

As shown in FIG. 6, the body 20 is composed of thirty-three multilayered (PTFE-made) plate members $25_1$, $25_2$, $25_3$, ... and $25_{33}$, all of which, except one disposed at the bottom of the body 20, individually have an opening at the center such that the area of the opening of each plate member becomes larger as the plate member is located more far apart from the bottom of the body 20. Therefore, the apparatus body 20 has a conical cavity extending to the top of the body 20 as shown in FIGS. 4 and 5.

Figure 7A:
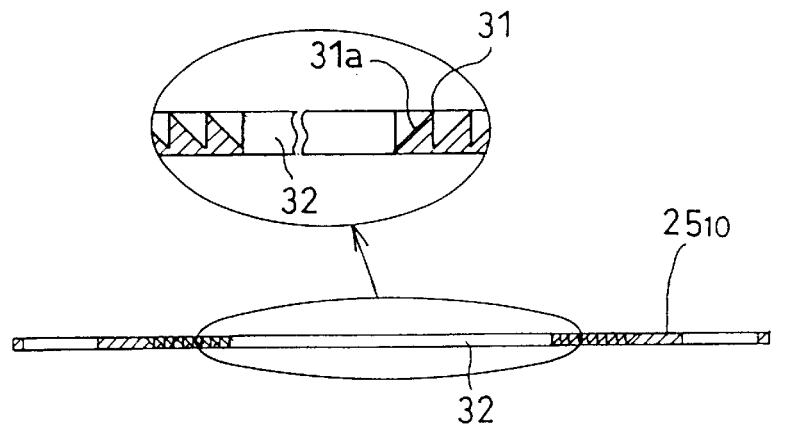
FIGS. 7A and 7B are views illustrating one type of the plate member used in the apparatus of FIG. 4.
Figure 7B:
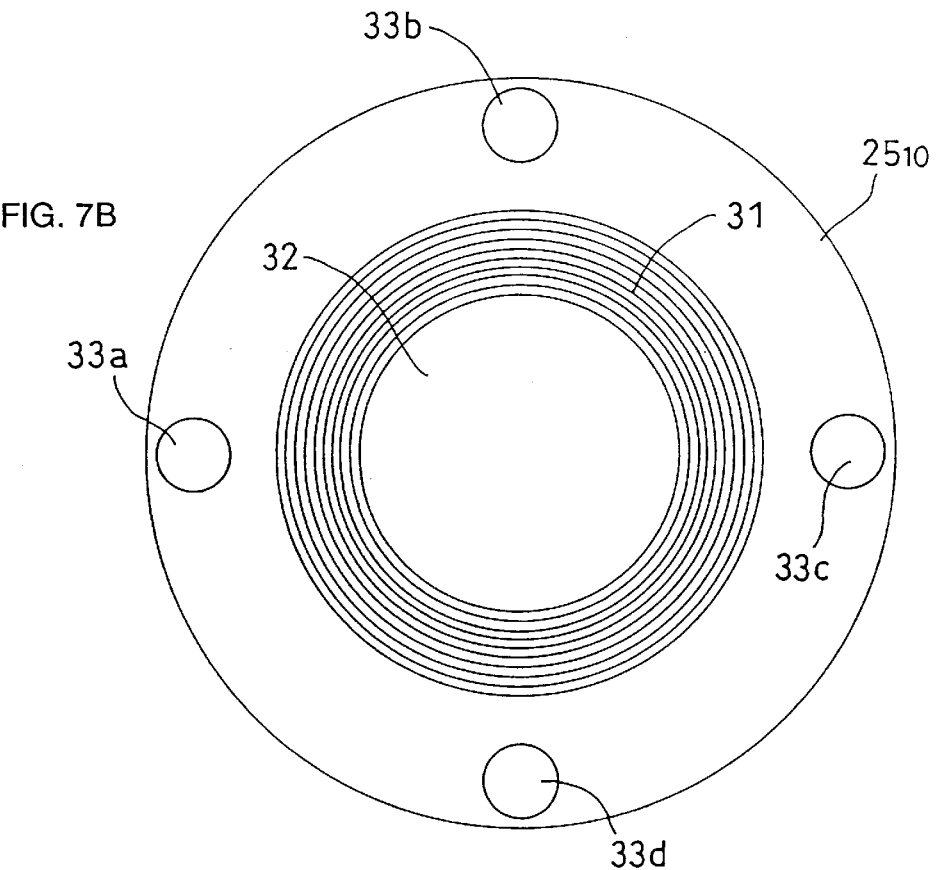

Typical structures of the plate members used in the apparatus are shown in FIGS. 7A and 7B and FIGS. 8A and 8B. FIGS. 7A a sectional view of a plate member $25_{10}$ which is the 10th plate from the top of the multilayered plate members, and FIG. 7B is a plane view thereof. A plate member $25_{10}$ is composed of a PTFE plate of 1.2 mm thick which is processed to have ten circularly protruding portions 31 on the upper surface. The circularly protruding portions 31 individually have a triangular cross section with a height of 1.0 mm, and arranged on the plate concentrically and continuously in the radial direction. Inclined surfaces 31a forming a part of the triangular cross section of the circularly protruding portions 31, which are inclined against the beam axis of the incident neutron beam and serve as the incident surfaces, are arranged to incline toward the center of the concentric circles (i.e., the central axis of the apparatus body 20). A circular opening 32 is provided on the center portion of the plate $25_{10}$ where no protruding portion is provided. Holes 33a–33d are provided on the limb of the plate member $25_{10}$, through which pins 23 are to be inserted.

Figure 8A:
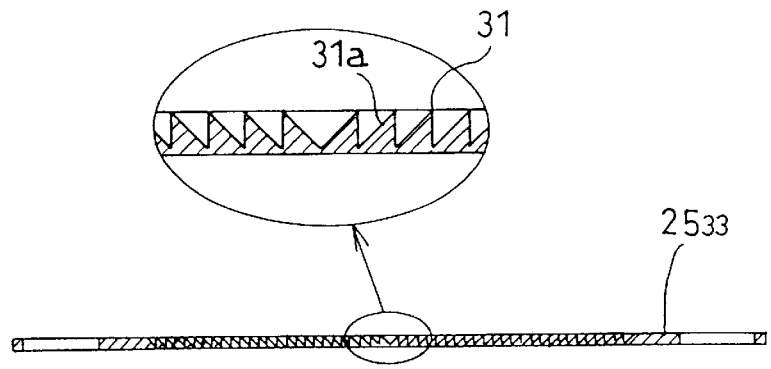
FIGS. 8A and 8B are views illustrating another type of the plate member used in the apparatus of FIG. 4.
Figure 8B:
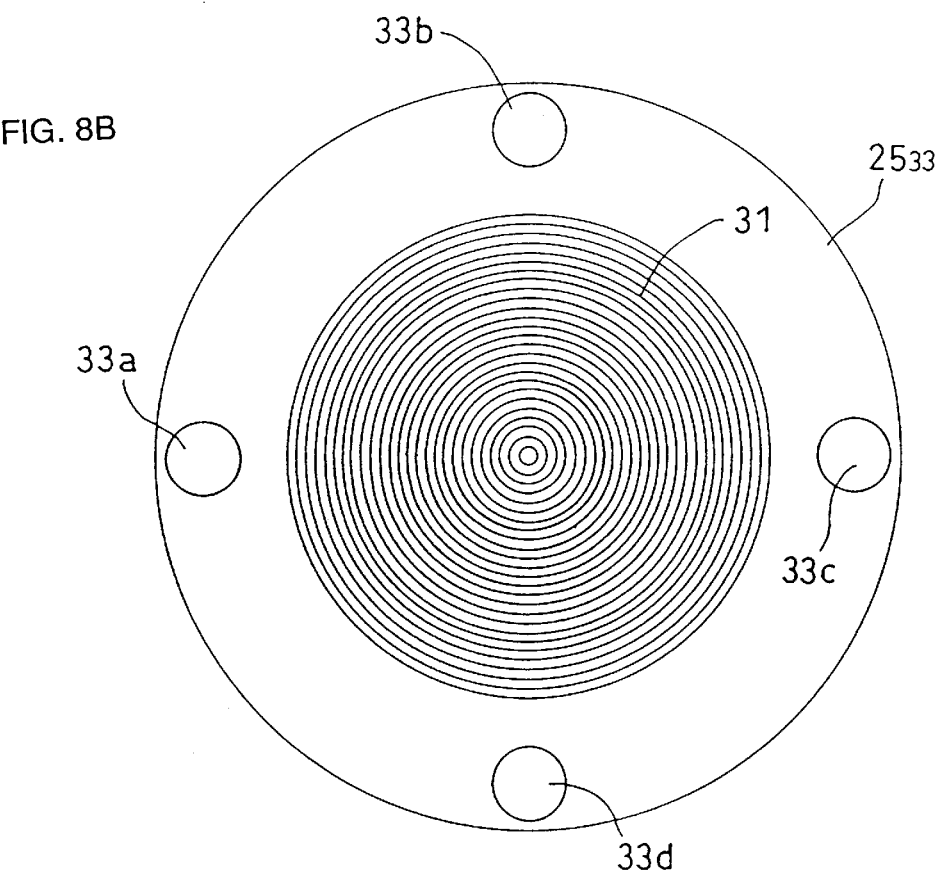

FIGS. 8A a sectional view of a plate member $25_{33}$ which is the bottom of the multilayered 33 plate members, and FIG. 8B is a plane view thereof. The plate member $25_{33}$ is composed of a PTFE plate of 1.2 mm thick which is processed to have on the upper surface thirty-three circularly protruding portions 31. The circularly protruding portions 31 individually have a triangular cross section with a height of 1.0 mm, and arranged on the plate concentrically and continuously in a radial direction. Inclined surfaces 31a forming a part of the triangular cross section of the circularly protruding portions 31, which are inclined against the beam axis of the incident neutron beam and serve as the incident surfaces, are arranged to incline toward the center of the concentric circles. Unlike other plate members $25_1$–$25_{32}$, the plate member $25_{33}$ has no center opening. Holes 33a–33d are provided on the limb of the plate member $25_{33}$ through which pins 23 are to be inserted.

As is apparent from the above description, a plate member $25_{32}$, which is the 2nd plate from the bottom, can be prepared by cutting off an area having the center circularly protruding portion of the plate member $25_{33}$ to provide a center opening. Similarly, a plate member $25_{31}$, which is the 3rd plate from the bottom, can be prepared by cutting off an area having two circularly protruding portions from the center of the plate member $25_{33}$ to provide a center opening. Thus, a plate member $25_{34-n}$ which is the n-th plate from the bottom, can be prepared by cutting off an area having n circularly protruding portions from the center of the plate member $25_{33}$ to provide a center opening.

Neutron beam parallel to the central axis of the neutron beam controlling apparatus is incident obliquely upon the inclined surfaces 31a of the circularly protruding portions 31 on the plate members 251–2533 which causes the deflection of the neutron beam to the direction of the central axis as shown in FIGS. 1, 3A and 3B. Neutron beam incident upon the area closer to the central axis of the apparatus is deflected to a smaller extent since the neutron beam passes through relatively small numbers of circularly protruding portions. Whereas neutron beam incident upon the area apart from the central axis is deflected to a greater extent since the neutron beam passes through relatively large numbers of circularly protruding portions. For example, neutron beam incident upon the circularly protruding portion located at the center of the apparatus undergoes only once refraction on the inclined surface, whereas neutron beam incident upon the circularly protruding portion located at the most outside of the apparatus undergoes 33 times of refraction in total on the most outside inclined surfaces of the plate members 251–2533. In this manner, the neutron beam controlling apparatus of this embodiment exhibits a function similar to the function of a convex lens in an optic system and, therefore, can focus neutron beam to a small area.

For example, when the angle α formed by the inclined surface 31a of the circularly protruding portion 31 with the bottom surface of the plate member 25 is 45° and neutron beam of 14Å wavelength which is parallel to the center axis of the apparatus is incident to the apparatus, the neutron beam is focused to the position about 3 m apart from the apparatus. Therefore, it is appreciated that a double-stacked type of the apparatus enables neutron beam of 14Å wavelength to be focused to the position about 1.5 m apart from the apparatus and a triple-stacked type of the apparatus enables the neutron beam to be focused to the position about 1 m apart from the apparatus. Neutron beam of 20Å wavelength which is parallel to the center axis of the apparatus can be focused to the position about 1.5 m apart from the apparatus by employing only one stack of the apparatus.

In the neutron beam controlling apparatus, the angle a formed by the inclined surface 31a with the bottom surface of the plate member 25 needs not to be 45°, and any angle may be employed depending on the processing precision of the material for the plate members 25 and the performances required to the apparatus. The number of the plate members 25 also needs not to be thirty-three. For example, a plurality (e.g., two) of plate members 25 all having the same number of circularly protruding portions 31 may also be employed. In this embodiment, the angles of inclination of the inclined surfaces 31a are all the same. However, the angles may be varied such that circularly protruding portions 31 located more far apart from the central axis of the apparatus have larger angles of inclination of the inclined surfaces 31a.

Embodiment 3

Figure 9:
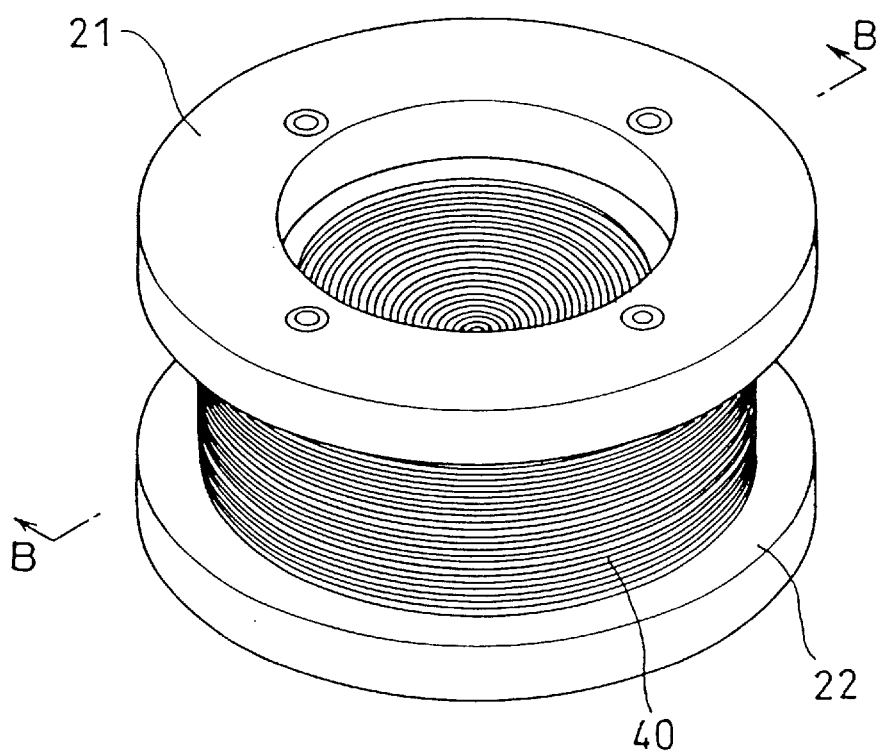
FIG. 9 is a general view of still another embodiment of the neutron beam controlling apparatus according to the present invention.
Figure 10:
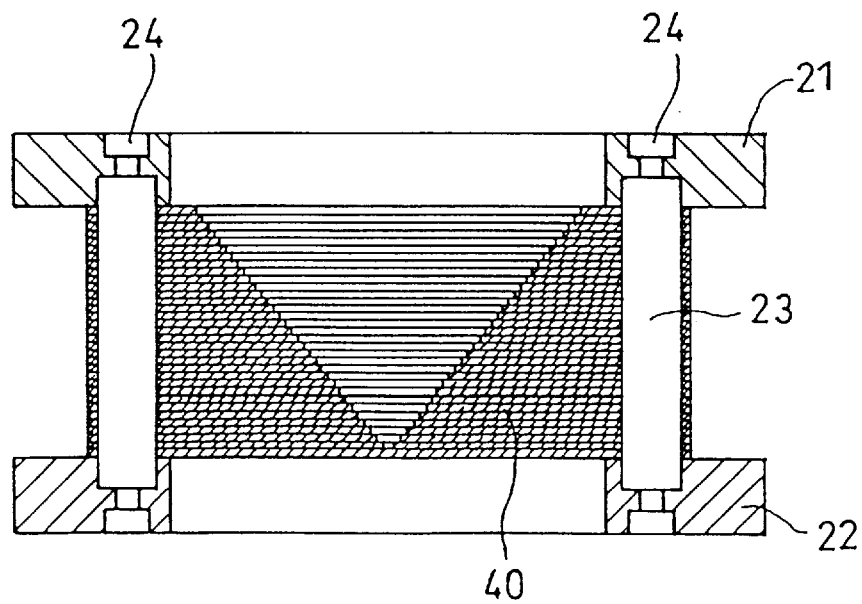
FIG. 10 is a sectional view taken along the lines B—B of FIG. 9.
Figure 11:
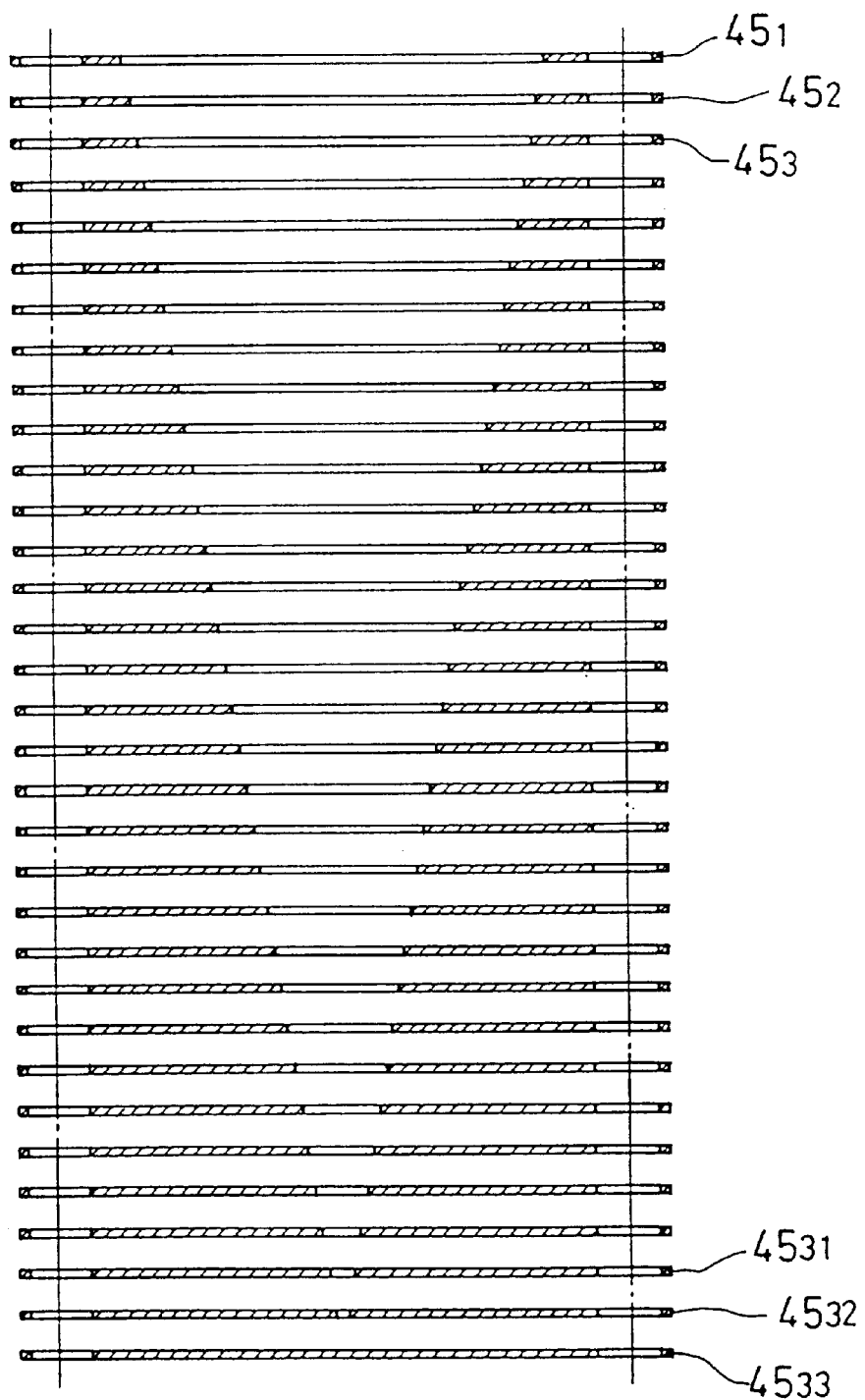
FIG. 11 is a partial exploded sectional view of the apparatus of FIG. 9.

Still another embodiment of the neutron beam controlling apparatus which functions to make neutron beam diverge will be illustrated hereinbelow. FIG. 9 is a general view of the neutron beam controlling apparatus; FIG. 10 is a sectional view taken along the lines B—B of FIG. 9; FIG. 11 is a partial exploded sectional view of the apparatus of FIG. 9; and FIGS. 12A and 12B, and 13A and 13B are views illustrating two types of plate members used in the apparatus of FIG. 9, respectively. In FIGS. 9–13B, parts and portions substantially equivalent to those shown in FIGS. 4–8B are given the same reference numbers.

The neutron beam controlling apparatus of this embodiment is composed of an apparatus body 40 and a pair of circular support frames 21 and 22 for supporting the body 40 therebetween.

As shown in FIG. 11, the apparatus body 40 is composed of multilayered thirty-three (PTFE-made) plate members $45_1, 45_2, 45_3, \ldots$ and $45_{33}$, all of which, except one disposed at the bottom of the body 40, individually have an opening at the center such that the area of the opening of each plate member becomes larger as the plate member is located more far apart from the bottom of the body 40. Therefore, the apparatus body 40 has a conical cavity extending to the top of the body 40 as shown in FIGS. 9 and 10.

Figure 12A:
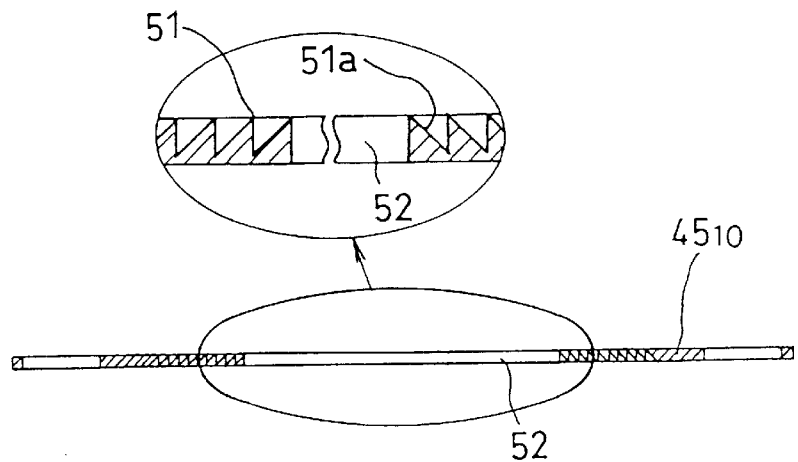
FIGS. 12A and 12B are views illustrating one type of the plate member used in the apparatus of FIG. 9.
Figure 12B:
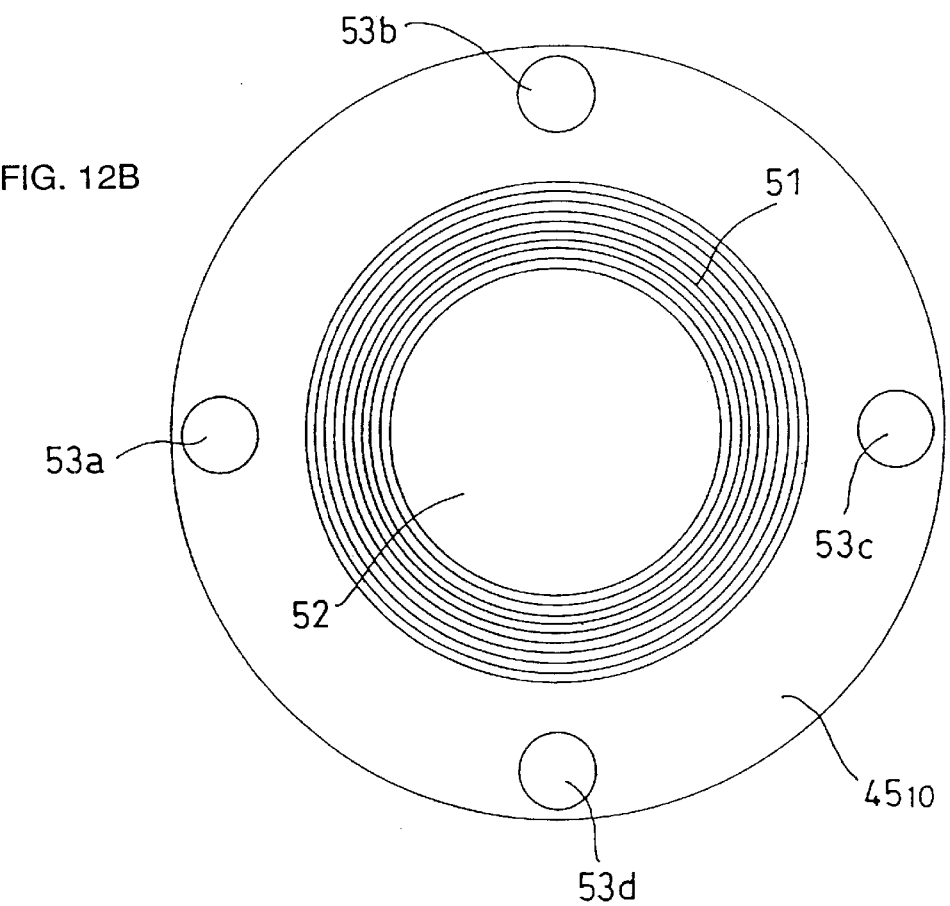

Typical structures of the plate members used in the apparatus are shown in FIGS. 12A and 12B and FIGS. 13A and 13B. FIGS. 12A a sectional view of a plate member $45_{10}$ which is the 10th plate from the top of the thirty-three multilayered plate members, and FIG. 12B is a plane view thereof. A plate member $45_{10}$ is composed of a PTFE plate of 1.2 mm thick which is processed to have on the upper surface ten circularly protruding portions 51. The circularly protruding portions 51 individually have a triangular cross section with a height of 1.0 mm, and arranged on the plate concentrically and continuously in a radial direction. Inclined surfaces 51a forming a part of the triangular cross section of the circularly protruding portions 51, which are inclined against the beam axis of the incident neutron beam and serve as the incident surfaces, are arranged to incline outward the concentric circles. A circular opening 52 is provided on the center portion of the plate $45_{10}$ where no protruding portion is provided. Holes 53a–53d are provided on the limb of the plate member $55_{10}$, through which pins 23 are to be inserted.

Figure 13A:
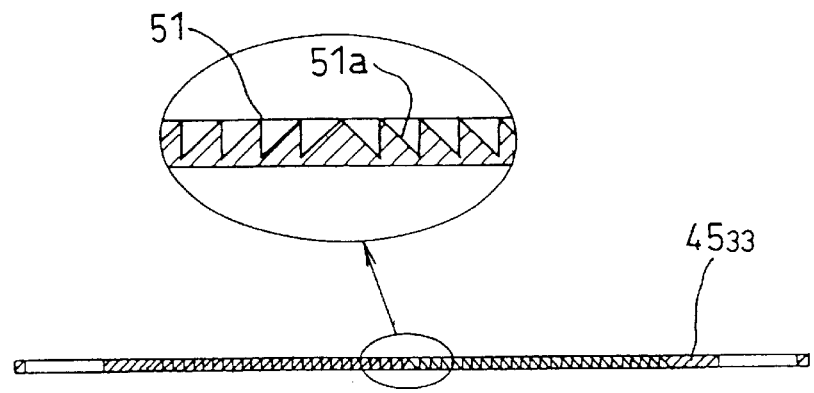
FIGS. 13A and 13B are views illustrating another type of the plate member used in the apparatus of FIG. 9.
Figure 13B:
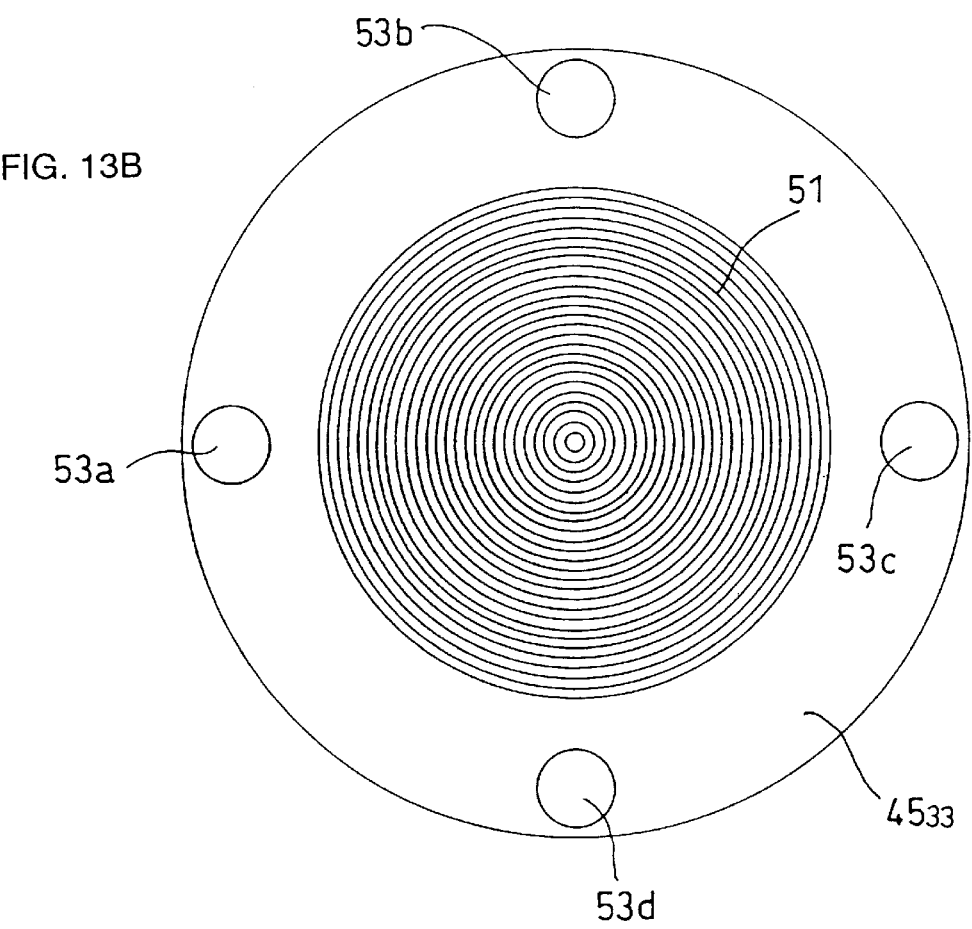

FIGS. 13A is a sectional view of a plate member $45_{33}$ which is the bottom of the multilayered 33 plate members, and FIG. 13B is a plane view thereof. The plate member $45_{33}$ is composed of a PTFE plate of 1.2 mm thick which is processed to have on the upper surface thirty-three circularly protruding portions 51. The circularly protruding minute portions 51 individually have a triangular cross section with a height of 1.0 mm, and arranged on the plate concentrically and continuously in a radial direction. Inclined surfaces 51a forming a part of the triangular cross section of the circularly protruding minute portions 51, which are inclined against the beam axis of the incident neutron beam and serve as the incident surfaces, are arranged to incline outward the concentric circles. Unlike other plate members $45_1$–$45_{32}$, the plate member $45_{33}$ has no center opening. Holes 53a–53d are provided on the limb of the plate member $45_{33}$ through which pins 43 are to be inserted.

As is apparent from the above description, a plate member $45_{32}$, which is the 2nd plate from the bottom, can be prepared by cutting off an area having the center circularly protruding portion of the plate member $25_{33}$ to provide a center opening. Similarly, a plate member $45_{31}$, which is the 3rd plate from the bottom, can be prepared by cutting off an area having two circularly protruding minute portions from the center of the plate member $45_{33}$ to provide a center opening. In turn, a plate member $45_{34-n}$, which is the n-th plate from the bottom, can be prepared by cutting off an area having n circularly protruding portions from the center of the plate member $45_{33}$ to provide a center opening.

The neutron beam controlling apparatus of this embodiment is a variation of the apparatus of Embodiment 2 in which each of the circularly protruding portions is modified to have an inclined surface facing outward the central axis of the apparatus.

Neutron beam parallel to the central axis of the neutron beam controlling apparatus is incident obliquely upon the inclined surfaces 51a of the circularly protruding portions 51 on the plate members $45_1$–$45_{33}$, resulting in the deflection of the neutron beam to the direction of the central axis as shown in FIGS. 1, 3A and 3B. Neutron beam incident upon the area closer to the central axis of the apparatus is deflected to a smaller extent since it passes through relatively small numbers of circularly protruding minute portions. Whereas neutron beam incident upon the area apart from the central axis is deflected to a greater extent since it passes through relatively large numbers of circularly protruding portions. For example, neutron beam incident upon the circularly protruding portion located at the center of the apparatus undergoes only once refraction on the inclined surface, whereas neutron beam incident upon the circularly protruding portion located at the most outside of the apparatus undergoes 33 times of refraction in total on the most outside inclined surfaces of the plate members $45_1$–$45_{33}$. In this manner, the neutron beam controlling apparatus of this embodiment exhibits a function similar to the function of a concave lens in an optic system and, therefore, can make neutron beam diverge.

For example, when the angle α formed by the inclined surface 51a of the circularly protruding portion 51 with the bottom surface of the plate member 25 is 45° and neutron beam of 14Å wavelength which is parallel to the axis of the apparatus is incident to the apparatus, the neutron beam passing through the most outer portion of the plate members is swept away from the central axis of the apparatus by about 4.5 mrad.

In the neutron beam controlling apparatus, the angle α formed by the inclined surface 51a with the bottom surface of the plate member 45 needs not to be 45°, and any angle may be employed depending on the processing precision of the material for the plate members 45 and the performances required to the apparatus. The number of the plate members 45 also needs not to be thirty-three. For example, a plurality (e.g., two) of plate members 45 all having the same number of circularly protruding portions 51 may also be employed. In this embodiment, the angles of inclination of the inclined surfaces 51a are all the same. However, the angles may be varied such that circularly protruding portions 51 located more far apart from the central axis of the apparatus have larger angles of inclination of the inclined surfaces 51a.

Embodiment 4

Figure 14:
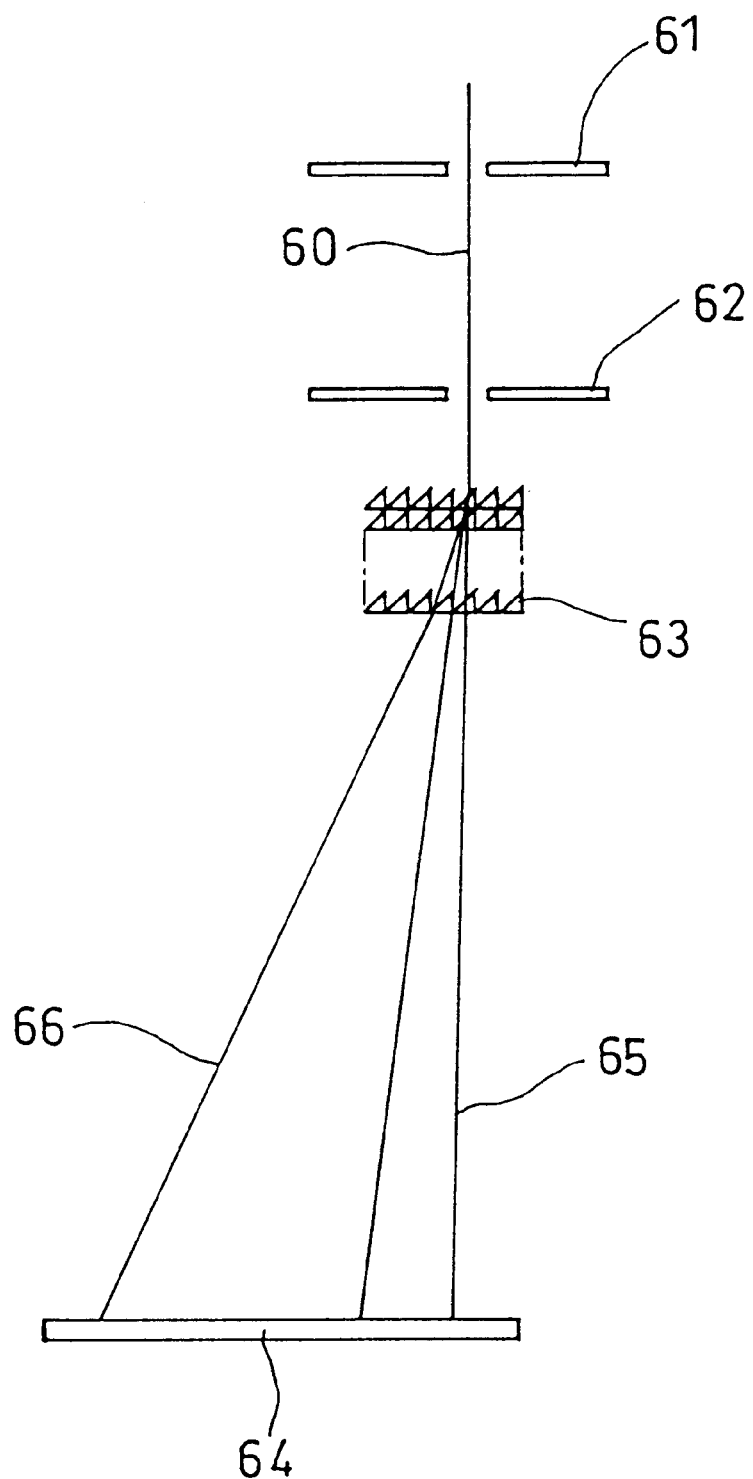
FIG. 14 is a schematic view of a neutron energy measuring apparatus according to the present invention.

FIG. 14 schematically illustrates an embodiment of the neutron energy measuring apparatus according to the present invention. This apparatus is composed of slits 61 and 62 for emitting therefrom neutrons 60 in the form of neutron beam, a neutron beam controlling apparatus 63 for energy divergence of the neutron beam 60 and a position-sensitive neutron detector 64. The neutron beam controlling apparatus 63 may be one as described in Embodiment 1 which functions to bend neutron beam to one direction. The wavelength λ and the angle of refraction δ of neutrons have a relationship defined by the following equation:

$$\delta/\lambda^2 = \text{constant}.$$

Fast neutrons 65 (i.e., neutrons with higher energy and shorter wavelength) are deflected by the neutron beam controlling apparatus 63 to a smaller extent, and slow neutrons 66 (i.e., neutrons with lower energy and longer wavelength) are deflected to a greater extent. The incidence positions of the neutrons from the neutron beam controlling apparatus 63 is detected in the position-sensitive neutron detector 64 to determine the energy (wavelength, velocity) of the neutrons or the energy distribution of the neutrons.

Embodiment 5

Figure 15:
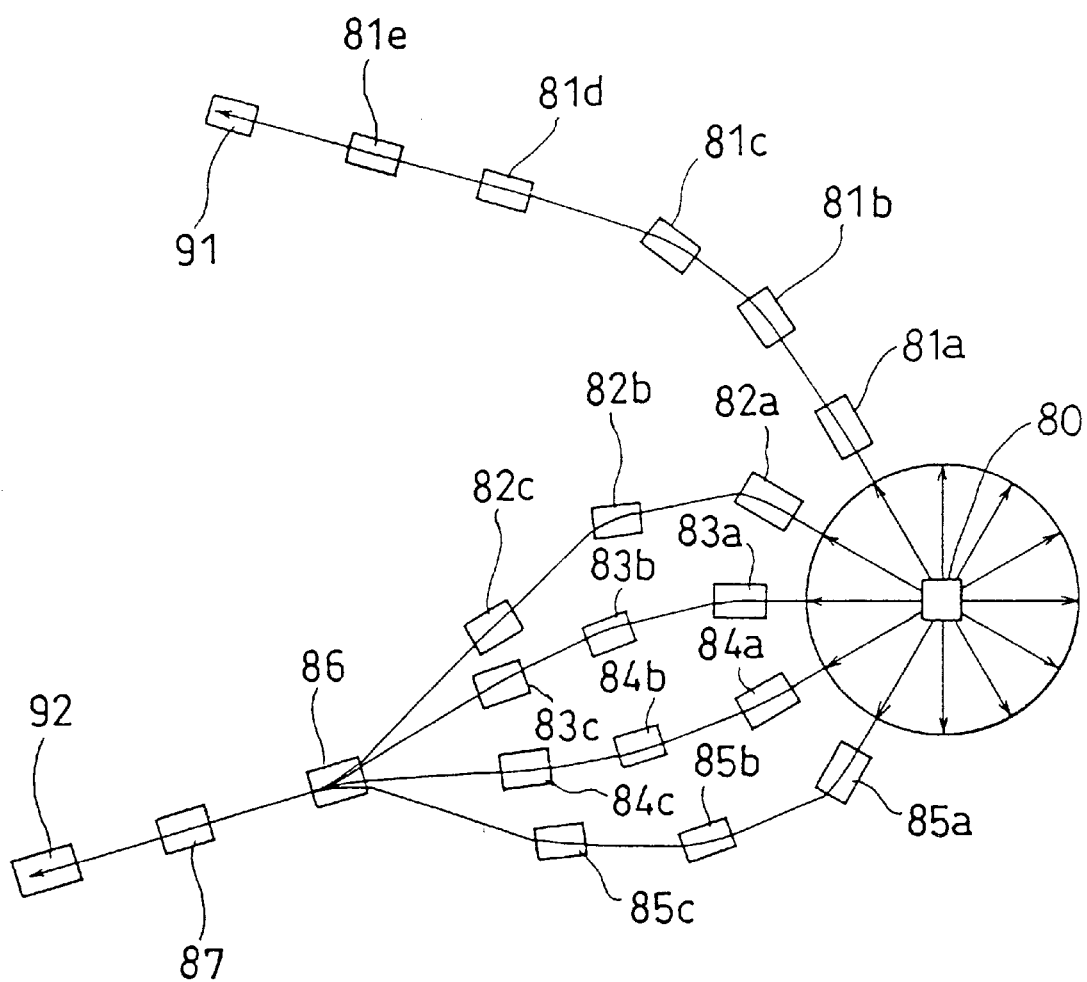
FIG. 15 is a schematic view illustrating an embodiment of the combination of a neutron beam convergence controlling apparatus, a neutron beam divergence controlling apparatus and a neutron beam trajectory curve controlling apparatus according to the present invention.
Figure 17:
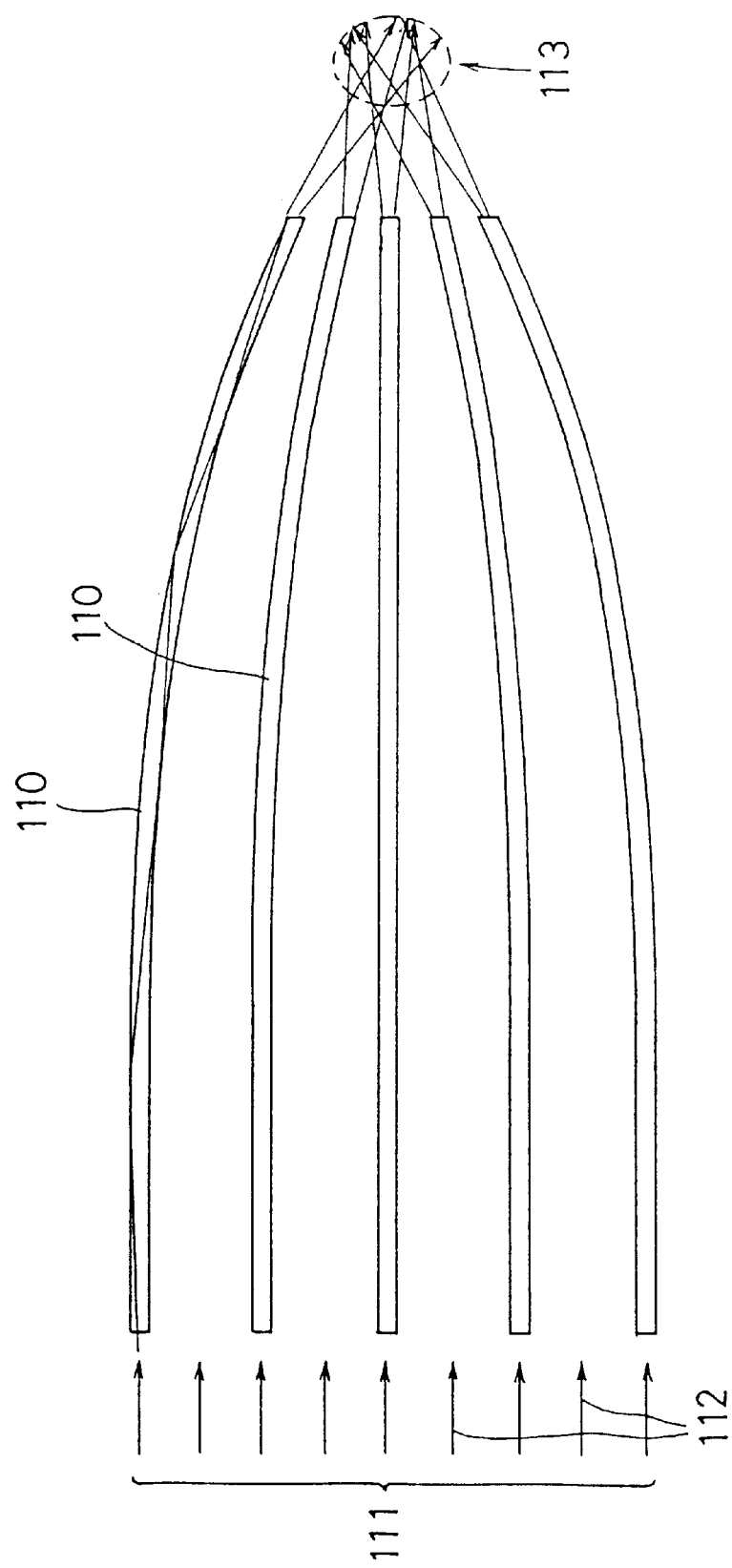
FIG. 17 is a view illustrating a method for increasing the neutron density by use of a capillary guide.

FIG. 15 schematically illustrates an embodiment of the combination of a neutron beam convergence controlling apparatus, a neutron beam divergence controlling apparatus and a neutron beam trajectory curve controlling apparatus according to the present invention. The neutron beam convergence controlling apparatus may be one as described in Embodiment 2 with reference to FIGS. 4–8B. The neutron beam divergence controlling apparatus may be one as described in Embodiment 3 with reference to FIGS. 9–13B. The neutron beam trajectory curve controlling apparatus may be one as described in Embodiment 1 with reference to FIGS. 2A–3B.

A neutron beam source 80 employed may be a nuclear reactor, a spallation neutron source using an accelerator, a source in which high energy neutrons emitted from radioactive isotopes are moderated by a moderator, or the like. As shown by arrows, the neutrons are emitted in all directions from the surface of the moderator.

The neutrons are extracted to various directions from the neutron source 80. Some of the extracted neutrons are passed through a neutron beam convergence controlling apparatus 81a and a neutron beam divergence controlling apparatus 81b to be focused into a dense beam, which is then bend through a neutron beam trajectory curve controlling apparatus 81c. The beam is then passed through another neutron beam convergence controlling apparatus 81d and another neutron beam divergence controlling apparatus 81e to be further focused into a thin and dense beam, which may be guided to a neutron beam utilization apparatus 91. The others are divided into some portions. Each of the neutron beam portions is also passed through a neutron beam convergence controlling apparatus 82a, 83a, 84a or 85a and a neutron beam divergence controlling apparatus 82b, 83b, 84b or 85b to be focused into a thin and dense beam. The beam is passed through a neutron beam trajectory curve controlling apparatus 82c, 83c, 84c or 85c. The beams from the neutron beam trajectory curve controlling apparatuses 82c, 83c, 84c and 85c are combined into one beam. The beam is passed through another neutron beam convergence controlling apparatus 86 and then another neutron beam divergence controlling apparatus 87 to be further focused into a thin and dense beam, which may be guided to a neutron beam utilization apparatus 92. This arrangement makes it possible to generate neutron beams with a high intensity and a controlled beam divergence, and to improve the efficiency of utilization of neutron beams. As a result, it becomes possible to carry out the investigation of very small samples, which has been impossible so far due to the problems of intensity inherent to such samples. It becomes also possible to carry out in situ measurements of samples, which have been difficult to be done so far due to the problems of intensity inherent to in situ measurements.

All publications, patents and patent applications cited herein are incorporated herein by reference in their entirety.

What is claimed is:

1. A neutron beam controlling apparatus comprising a plurality of multilayered plate members, each of the plate members having on its one or both surfaces one or a plurality of minute protruding portions, and each of the protruding portions having an inclined surface which is inclined against the beam axis of neutron beam and serves as an incident plane or an outgoing plane for the neutron beam, wherein each of the minute protruding portions is a long and narrow protrusion extending in an area-wise direction and having both the inclined surface and a surface approximately normal to the plate member.

2. The neutron beam controlling apparatus of claim 1, wherein each of the plate members comprises at least one element selected from the group consisting of oxygen (O), carbon (C), beryllium (Be), fluorine (F) and deuterium ($D_2$).

3. The neutron beam controlling apparatus of claim 1, wherein each of the plate members comprises a material selected from the group consisting of polytetrafluoroethylene, carbon, deuterated polyethylene, heavy water and dry ice.

4. A neutron beam controlling apparatus comprising a plurality of multilayered plate members, each of the plate members having on its one or both surfaces one or a plurality of minute protruding portions, and each of the protruding portions having an inclined surface which is inclined against the beam axis of neutron beam and serves as an incident plane or an outgoing plane for the neutron beam, wherein each of the minute protruding portions is a long, narrow and linear protrusion having both the inclined surface and a surface approximately normal to the plate member, and all of the inclined surfaces incline toward the same direction.

5. A neutron energy measuring apparatus comprising:
   means for emitting neutrons therefrom in the form of neutron beam;
   a neutron beam controlling apparatus according to claim 4 to which the neutron beam is incident; and
   a position-sensitive neutron detector for detecting the neutrons emitted from the neutron beam controlling apparatus.

6. The neutron beam controlling apparatus of claim 4, wherein each of the plate members comprises a material mainly comprising at least one element selected from the group consisting of oxygen (O), carbon (C), beryllium (Be), fluorine (F) and deuterium ($D_2$).

7. The neutron beam controlling apparatus of claim 4, wherein each of the plate members comprises a material selected from the group consisting of polytetrafluoroethylene, carbon, deuterated polyethylene, heavy water and dry ice.

8. A neutron beam controlling apparatus comprising a plurality of multilayered plate members, each of the plate members having a first and second surface and on at least one of the surfaces one or a plurality of circularly protruding portions arranged so as to form a concentric structure around a central axis of the apparatus, each of the circularly protruding portions having a surface approximately normal to the plate member and a surface inclined toward the center of the concentric structure, wherein when the apparatus is observed in a direction parallel to the central axis, the superposition degree of the circularly protruding portions becomes larger as the distance from the central axis becomes longer.

9. A neutron beam controlling apparatus comprising
   (i) the neutron beam controlling apparatus according to claim 8; and
   (iii) a neutron beam controlling apparatus comprising a plurality of multilayered plate members, each of the plate members having a first and second surface and on at least one of the surfaces one or a plurality of circularly protruding portions arranged so as to form a concentric structure around a central axis of the apparatus, each of the circularly protruding portions having a surface approximately normal to the plate member and a surface inclined outward the concentric structure, wherein when the apparatus is observed in a direction parallel to the central axis, the superposition degree of the circularly protruding portions becomes larger as the distance from the central axis becomes longer.

10. The neutron beam controlling apparatus of claim 8, wherein each of the plate members comprises a material mainly comprising at least one element selected from the group consisting of oxygen (O), carbon (C), beryllium (Be), fluorine (F) and deuterium ($D_2$).

11. The neutron beam controlling apparatus of claim 8, wherein each of the plate members comprises a material selected from the group consisting of polytetrafluoroethylene, carbon, deuterated polyethylene, heavy water and dry ice.

12. A neutron beam controlling apparatus comprising a plurality of multilayered plate members, each of the plate members having a first and second surface and on at least one of the surfaces one or a plurality of circularly protruding portions arranged so as to form a concentric structure around a central axis of the apparatus, each of the circularly protruding portions having a surface approximately normal to the plate member and a surface inclined outward the concentric structure, wherein when the apparatus is observed in a direction parallel to the central axis, the superposition degree of the circularly protruding portions becomes larger as the distance from the central axis becomes longer.

13. The neutron beam controlling apparatus of claim 12, wherein each of the plate members comprises a material mainly comprising at least one element selected from the group consisting of oxygen (O), carbon (C), beryllium (Be), fluorine (F) and deuterium ($D_2$).

14. The neutron beam controlling apparatus of claim 12, wherein each of the plate members comprises a material selected from the group consisting of polytetrafluoroethylene, carbon, deuterated polyethylene, heavy water and dry ice.

15. The neutron beam controlling apparatus of claim 8 or 12, wherein at least one of the plate members has an opening portion at the center.

* * * * *